United States Patent
Reis

Patent Number: 6,088,089
Date of Patent: Jul. 11, 2000

[54] PROCESS AND DEVICE FOR MEASURING THE OPTICAL PROPERTIES OF SPECTACLE LENSES BY MEANS OF AN OPTICAL DETECTOR OF ENGRAVINGS IN THE SPECTACLE LENSES

[75] Inventor: Werner Reis, Munich, Germany

[73] Assignee: G. Rodenstock Instruments GmbH, Munich, Germany

[21] Appl. No.: 09/011,531

[22] PCT Filed: Jun. 27, 1996

[86] PCT No.: PCT/DE97/01347

§ 371 Date: Feb. 12, 1998

§ 102(e) Date: Feb. 12, 1998

[87] PCT Pub. No.: WO98/00693

PCT Pub. Date: Jan. 8, 1998

[30] Foreign Application Priority Data

Jun. 28, 1996 [DE] Germany .......................... 196 26 091

[51] Int. Cl.[7] .................................................. G01B 9/00
[52] U.S. Cl. .......................................... 356/124; 356/127
[58] Field of Search .................................... 356/124–127, 356/445, 446, 370; 351/51, 165

[56] References Cited

U.S. PATENT DOCUMENTS

| | | | |
|---|---|---|---|
| 3,812,374 | 5/1974 | Tuhro ........................................ | 356/446 |
| 4,194,814 | 3/1980 | Fischer et al. ....................... | 351/160 R |
| 5,894,348 | 4/1999 | Bacchi et al. ........................... | 356/446 |

*Primary Examiner*—Hoa Q. Pham
*Attorney, Agent, or Firm*—Antonelli, Terry, Stout & Kraus, LLP

[57] ABSTRACT

An apparatus for detecting parameters of an ophthalmic lens including a vertex refractometer having a lens support for the ophthalmic lens and a detection device for optical detection of at least one engraved marking on at least one predetermined surface area of the ophthalmic lens. The vertex refractometer has a measurement beam path which passes through the ophthalmic lens when the ophthalmic lens is lying on the lens support and the detection device has at least one light source, an imaging optical system for directing light from the at least one light source onto the at least one predetermined surface area of the ophthalmic lens with at least one engraved marking, and an optical receiver system having a light sensor which is connected to an evaluation and representation unit. The optical receiver system images light beams from the imaging optical system which are reflected from the at least one predetermined surface area of the ophthalmic lens. The vertex refractometer and the detection device are disposed so that a spacing between an axis of the measurement beam path of the vertex refractometer and an axis of the optical receiving system of the detection device is selected so that with the ophthalmic lens being positioned relative to the measuring beam path passing through the ophthalmic lens, the at least one predetermined surface area with the at least one engraved marking of the ophthalmic lens is illuminated by the at least one light source.

19 Claims, 4 Drawing Sheets

PROCESS AND DEVICE FOR MEASURING THE OPTICAL PROPERTIES OF SPECTACLE LENSES BY MEANS OF AN OPTICAL DETECTOR OF ENGRAVINGS IN THE SPECTACLE LENSES

TECHNICAL FIELD

The present invention relates to an apparatus and a process for measuring the spherical, prismatic and cylindrical power of ophthalmic lenses having a measuring beam path directed at the ophthalmic lens lying on a lens support and having a device for the optical detection of representations engraved on certain areas of the surface of the ophthalmic lens. An apparatus of this type and a process of this type are known from DE 44 14 784 A1.

STATE OF THE ART

Devices for measuring the optical properties of ophthalmic lenses are also referred to vertex refractometers and are described by way of illustration in DE 40 03 144 A1.

Such known vertex refractometers are employed for follow-up control of already finished ophthalmic lenses in order to check whether the prescribed optical power has been achieved in processing the ophthalmic lens. Moreover, vertex refractometers are also used to check the correct centering of ophthalmic lenses inside the eyeglass frames, in particular, in lenses with a cylindrical and prismatic power in which the cylindrical axes as well as the prism reference point play a very important role in grinding the ophthalmic lens and for inserting the lens in the frames. Incorrect insertion of lenses of this type in the frames can lead to major impaired vision for the user.

Moreover, so-called progressive lenses, which are provided with lens areas for distant respectively near vision in addition to the aforementioned optical power and to the resulting symmetrical axes respectively optical reference points, are provided with two further geometric reference points which have to be taken into account in centering the lens in the frames.

By way of illustration, a progressive ophthalmic lens with a spherical, cylindrical and prismatic power provided with a distant as well as a near region can be determined by the following symmetry-defining axes and reference points (see the representation of FIG. 2a):

Fundamentally, an ophthalmic lens is divided by the horizontal line G of the lens into an upper and a lower region. In the center of the horizontal line G of the lens is a so-called prism reference point BTPT whose purpose is to facilitate control of prismatic power.

Above the prism reference point BTPT (BP) is the so-called centering cross Z which is simultaneously, on the one hand, the reference point for the positioning of the lens in front of the eye and, on the other hand, for the correct insertion of the lens in the frames. Usually, the centering cross Z is, by way of illustration, in Rodenstock lenses exactly 4 millimeters above the prism reference point BTPT (BP). Above the centering cross Z in the progressive lens shown in FIG. 2a, the distance reference point BTFT (BF) is disposed at a distance of 8 millimeters above the horizontal line of the lens. The corresponding near reference point BTNT (BN) usually is 14 millimeters below the horizontal line of the lens and is disposed approximately 2.5 millimeters nasally offset to the distance reference point in the center of the circle.

Manufactured ophthalmic lenses are provided with markings as shown in FIG. 2a in order to facilitate centering for grinding the lens to fit the frames. However, if the markings are no longer on the surface of the ophthalmic lens, two diamond-shaped markings R1, R2 which are unalterably worked into the surface contour of the ophthalmic lens, define the position of the horizontal line of the lens. The markings are worked into the surface of the ophthalmic lens in such a manner that they are quasi invisible to the user. Ophthalmic lenses from Rodenstock are provided with other so-called micro-engravings, which permit reconstructing the type of lens and its respective reference values at any time, in addition to the unalterable markings R1 and R2 according to FIG. 2b. Furthermore, the addition A, which according to DIN 58203 represents the difference between the optical power of the near reference point BTNT and of the distance reference point BTFT, is provided as a number below the left diamond shown, in FIG. 2b. Below the right diamond R2 drawn in FIG. 2b is a second numerical specification (46) engraved into the ophthalmic lens, of which the first number (4) is the characteristic number for the base curve and the second number (6) the characteristic number for the refractive index. Finally, a company logo can be engraved preferably at a defined site below the lens diamond R1 for easier identification of the manufacturer.

The aforedescribed micro-engravings are generally also referred to as engraved representations on ophthalmic lenses. Their purpose is to permit accurate and quick determination of all the important values specifying the ophthalmic lens.

Frequently, only optical magnifying systems, with whose aid and visual observation, by way of illustration, markings for fixing the horizontal lines of the lens can be marked using colored dots, are employed for detecting the representations engraved on ophthalmic lenses. Similarly, the engraved representations can be read with the aid of a trained eye and corresponding oblique positioning of the ophthalmic lens in relation to incident light.

The aforecited printed publication DE 4414 784 A1, on which the present invention is based as the closest state of the art, describes, in particular with reference to FIG. 2, a device for the optical detection of ophthalmic markings respectively representations engraved on ophthalmic lenses, which is considered as part of a system (see FIG. 1 of the printed publication) for grinding at least the circumferential edge of the ophthalmic lenses. The device is disposed in the work area of a handling device, which moves the to-be-processed ophthalmic lens between various work areas. The detection device itself is provided with a lens support, above which a light source which illuminates the ophthalmic lens from above is disposed. An optical detector, which detects the light passing through the ophthalmic lens, is provided under the ophthalmic lens.

On the one hand, the system comprising a vertex refractometer, the aforedescribed device and an ophthalmic-lens-grinding machine is complicated to manufacture and maintain due to their single-component construction and therefore expensive. On the other hand, separate measurement of the optical properties of an ophthalmic lens and of the detection of representations engraved on the ophthalmic lens is time-consuming and difficult in view of the fact that locating the engraved representations on ophthalmic lenses without any data on the apex values obtained with the vertex refractometer is not simple.

DESCRIPTION OF THE INVENTION

Therefore, the object of the present invention is to provide an apparatus which utilizes better the representations engraved on ophthalmic lenses worked into the surface thereof, especially on ophthalmic lenses for further processing as well as subsequent control, by way of illustration, in checking whether an ophthalmic lens has been correctly fitted into the frames. In particular, the purpose of the unalterable data worked into the surface of the lens is to serve as reference respectively comparative data for measurement with vertex refractometers. Furthermore, a process is to be provided with which measurement of an ophthalmic lens can be carried out as quickly, simply and precisely as possible.

The present invention is based on the idea of a fundamental combination of an apparatus for measuring the spherical, prismatic and cylindrical power of optical lenses, in particular of ophthalmic lenses having a measuring beam path directed at the ophthalmic lens in an as such known manner and a device for the optical detection of engraved representations worked into certain surface areas of ophthalmic lenses. The invented combination of a vertex refractometer and an invented device for the optical detection of representations engraved on ophthalmic lenses permits quicker and more accurate detection of all the values required for the comprehensive determination of the optical properties of an ophthalmic lens.

Known vertex refractometers are provided with a lens support in the measurement beam path on which a to-be-measured ophthalmic lens can be positioned. If the ophthalmic lens is in a defined starting position, which usually is directed according to the horizontal lines of the lens, relative to the measurement beam, path, all the optical reference points mentioned in the preceding description can be easily approached and determined. The adjustment procedure of the ophthalmic lens on the lens support can, in particular, be accurately and quickly carried out utilizing the diamond engravings R1 and R2 defining the horizontal lines of the lens.

A feature of the present invention is to provide an apparatus for measuring the spherical, prismatic and cylindrical power of an ophthalmic lens having a measurement beam path directed at an ophthalmic lens lying on a lens support and having a device for the optical detection of representations engraved on ophthalmic lenses worked into certain areas of the surface of ophthalmic lenses in such a manner that the device for the optical detection of the representations engraved on ophthalmic lenses is provided with at least one light source, whose light is directed at the area having the engraved representations, disposed above the lens support, and with an optical reception system having a light sensor, and that the measurement beam path is disposed relative to the device for optical detection of the engraved representations in such a manner that the measurement beam passes through the ophthalmic lens lying on the lens support and simultaneously the light source illuminates the region of the engraved representations and can be detected using the optical reception system.

Two light sources, one illuminating the engraved representations R1, the addition value and the company logo, and the other the engraved representations R2, the characterizing numbers for the base curve and the refractive index, are utilized for simultaneous detection of the representations engraved on the ophthalmic lens depicted in FIG. 2b. The light reflected at these two areas of engraved representations on the ophthalmic lens is directed into an imaging optic of an optical reception system which finally guides the two light bundles for further evaluation to a light sensor, preferably a CCD sensor.

The reception system is disposed in the center between the two light sources in such a manner that the optical axis of the receptions optic of the optical reception system is oriented perpendicular to the plane of the ophthalmic lens. Due to the spatial arrangement of the areas with the engraved representations, the light bundles coming from the light sources are directed at the surface of the ophthalmic lens in such a manner that their beam axes include an angle larger than 0° respectively with the optical axis of the imaging optic of the optical reception system.

The optical axis of the measurement beam of the vertex refractometer is preferably disposed parallel to the optical axis of the reception system in such a manner permitting optical measurement of the ophthalmic lens simultaneously with the detection of the representations engraved on the ophthalmic lens. In this manner measured data can be represented, by way of illustration, on a LCD screen with the aid of suited evaluation and representation symbols.

The invented combination of a known vertex refractometer and a device for the optical detection of representations on ophthalmic lenses has a number of advantages:

The optical detection of the diamond markings defining the horizontal line of the lens permits simple centering of the lens within the vertex refractometer.

The optical power in the near reference point and in the distant reference point detected with the aid of the vertex refractometer can be compared by means of the engraved representations, giving the addition. Possible measurement errors, which by way of illustration can be due to imprecise aligning the lens relative to the measurement beam path, can be easily eliminated.

The illumination of the representations engraved on the lens ensues preferably using light-emitting diodes (LED) which emit in the infrared frequency range. Due to a downstream imaging optic, comprising a pair of cylindrical lenses, a lens-shaped spot of light is created on the representations engraved on the lens in such a manner that the engraved representations are completely illuminated by the light source. The light beams reflected in this area reach into a reception optic of the optical reception system in which they are imaged on a light-sensitive sensor which for its part is connected to an evaluation and a representation unit. In this manner, the representations engraved on an ophthalmic lens, which are invisible to the untrained eye, can be visibly depicted with high resolution on a screen. Easy identification of the type of lens and the manufacturer thereof becomes possible in this manner.

By using the engraved representations, an ophthalmic lens, such as by way of illustration a progressive lens, can be quickly and accurately measured. The advantage of the invented process lies, in particular, in the fact that the data contained in the representations engraved on the ophthalmic lens, such as by way of illustration the addition value can be compared with the actually measured values of the optical power in the distance and near reference points of the ophthalmic lens. These points can be quickly and accurately approached from a starting point, which is prescribed by the horizontal lines of the lens and the prism reference point, in particular if the ophthalmic lens can be determined in the x/y plane using a distance sensor.

A BRIEF DESCRIPTION OF THE DRAWINGS

The present invention is made more apparent, by way of example, in the following using preferred embodiments with reference to the accompanying drawings depicting in:

FIG. 1 a schematic cross sectional representation of the invented device for the optical detection of representations engraved on ophthalmic lenses, FIG. 2a a representation of the markings on a progressive ophthalmic lens, FIG. 2b a representation of the engraved ophthalmic representations on an ophthalmic lens, FIG. 3 a schematic representation of the individual components of the invented combination of a vertex refractometer and the device for optical detection of engraved ophthalmic representations, FIG. 4 a device for the determination of an ophthalmic lens in the x-y plane.

DESCRIPTION OF A PREFERRED EMBODIMENT

Figure 1:
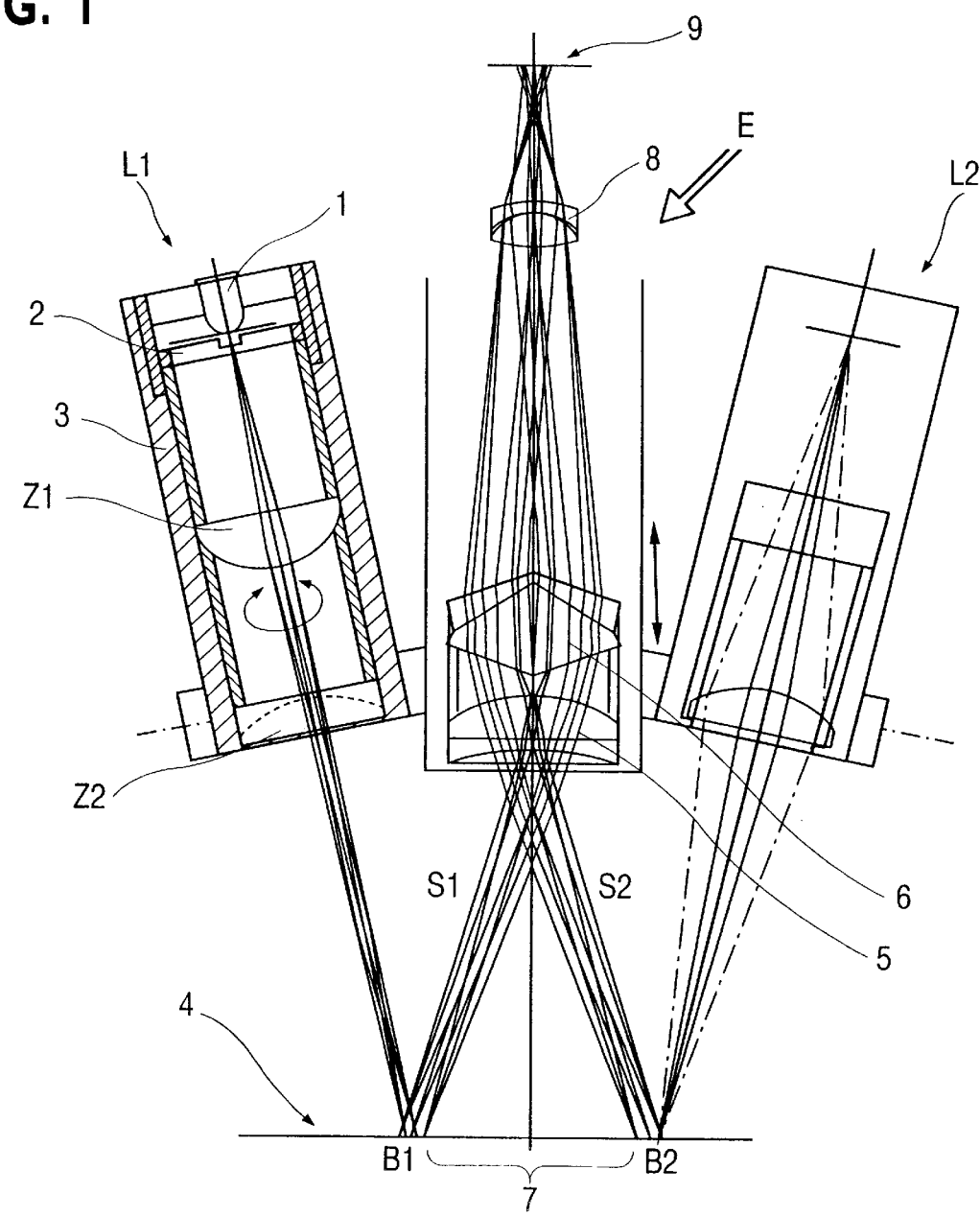

The device for the optical detection of representations engraved on ophthalmic lenses shown in FIG. 1 is provided with two light sources L1 and L2 each having a LED 1 (depicted only in the left light source L1) and a frames casing 2 in which a pair of cylindrical lenses Z1 and Z2, whose axes are perpendicular to each other, are disposed. Preferably the pair of cylindrical lenses Z1 and Z2 are disposed in a rotatable manner in the casing part 3 of the light source.

Due to the arrangement of the cylindrical lenses, an eliptical illumination area, which is adapted to the area of the engraved representations, is imaged on the surface 4 of the ophthalmic lens. The light beams S1 and S2, which are reflected on both sides of the surface 4 of the ophthalmic lens, enter the optical reception system E, which is provided with an achromatic lens 5 facing the surface 4 of the ophthalmic lens and with a prism 6 which is firmly connected to the achromatic lens 5. The purpose of the prism 6 is to fade out the intermediate area 7 between the engraved representations B1 and B2 on the ophthalmic lens in such a manner that the areas with the engraved representations can be imaged magnified. Another focusing achromatic lens 8, which images the images of the engraved representations B1 and B2 on a CCD light sensor 9, is provided downstream in the beam direction. In addition, an infrared filter and a shadow mask for increasing the depth of sharpness can be provided in the optical reception system for fading out the background light, which however are not depicted in the figure.

Preferably, the achromatic lens 5 can be adjusted in height in conjunction with the prism 6 (see double arrow) in order to be able in this manner to carry out respective focusing adjustment.

The optical axis of the optical reception system E is perpendicular to the surface 4 of the ophthalmic lens, with the optical axes of the illumination units L1 and L2 including an angle with the optical axis of the reception system.

Figure 2A:
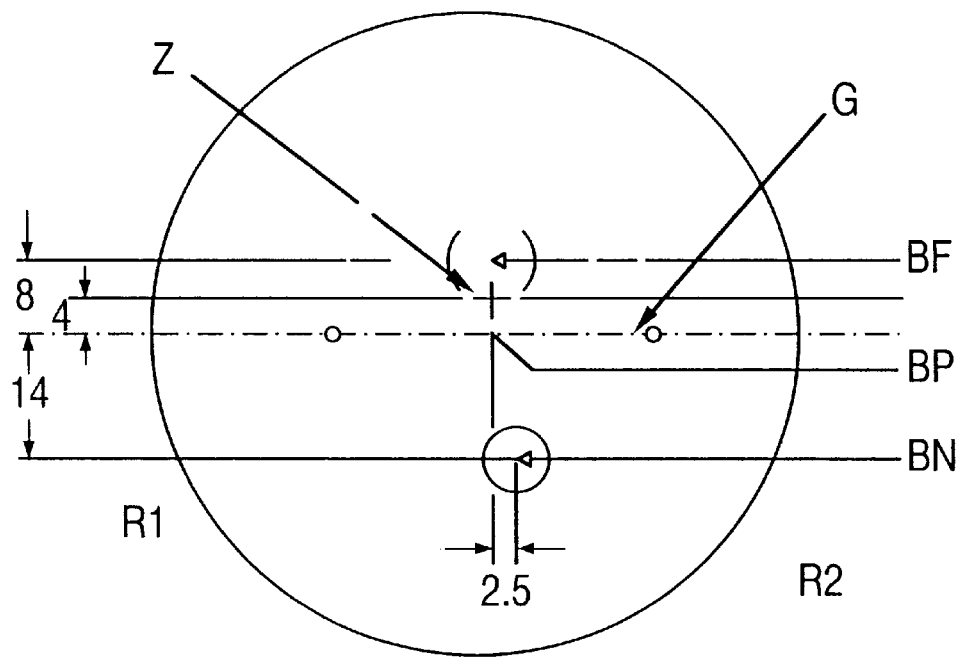
Figure 2B:
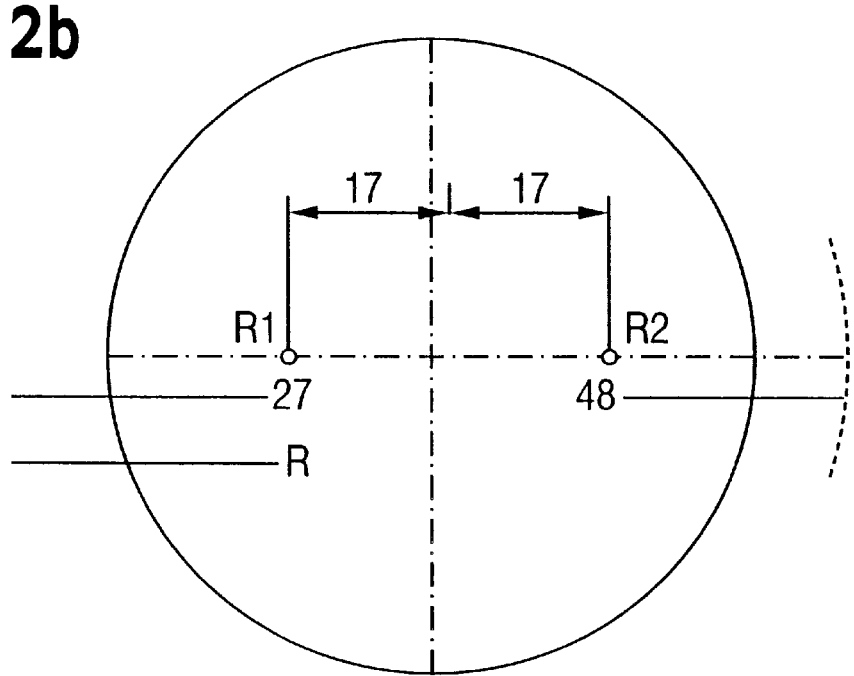

For the description of FIGS. 2a and 2b reference is made to the preceding accounts.

Figure 3:
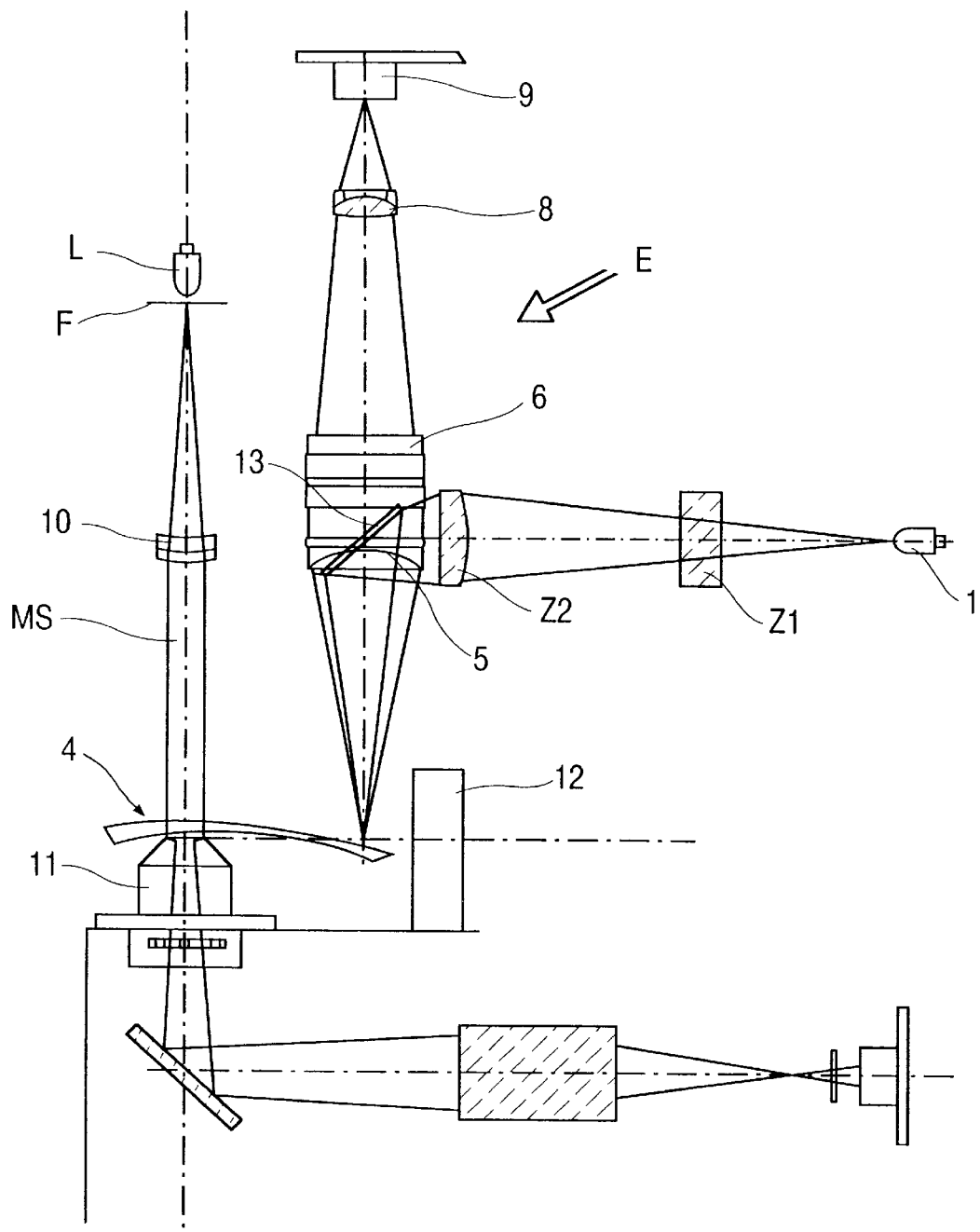

FIG. 3 is a schematic diagram of the invented combination of a vertex refractometer having a device for the optical detection of engraved representations on ophthalmic lenses.

The schematic representation of the vertex refractometer comprises a lamp L, a field diaphragm F and a focusing achromatic lens 10 which directs the measurement beam MS parallel and at the surface 4 of the ophthalmic lens. The ophthalmic lens lies on a lens support 11 and abuts in horizontal direction on an ophthalmic lens abutment 12. The optic for evaluating the optical power of the ophthalmic lens downstream in the measurement beam path will not be dealt with in further detail herein. The downstream components are depicted only for the sake providing a complete picture.

The optical axis of the measurement beam path MS and the optical axis of the optical reception system E are directed perpendicular to the surface 4 of the lens. The reciprocal spacing of the axes is selected in such a manner that, with the respective positioning of the ophthalmic lens relative to the measurement beam path MS, the areas with the engraved representations on the ophthalmic lens are also illuminated by the light sources and can be detected by means of the optical reception device.

For improved spatial arrangement, in this preferred embodiment the illumination beam for the areas with engraved representations on the ophthalmic lens is bent by means of a deflection mirror 13.

Moreover, the parallel measurement of the ophthalmic lens using the vertex refractometer and the device for the optical detection of engraved representations on ophthalmic lenses permits obtaining accurate two-dimensional positioning of the ophthalmic lens on the lens support 11. The unequivocal geometric allocation of the respective reference points, which by way of illustration are described in FIGS. 2a and 2b, permits accurate determination of the lens in the x-y p lane, i.e. in the lens support plane, and controlled movement thereof accordingly.

Figure 4:
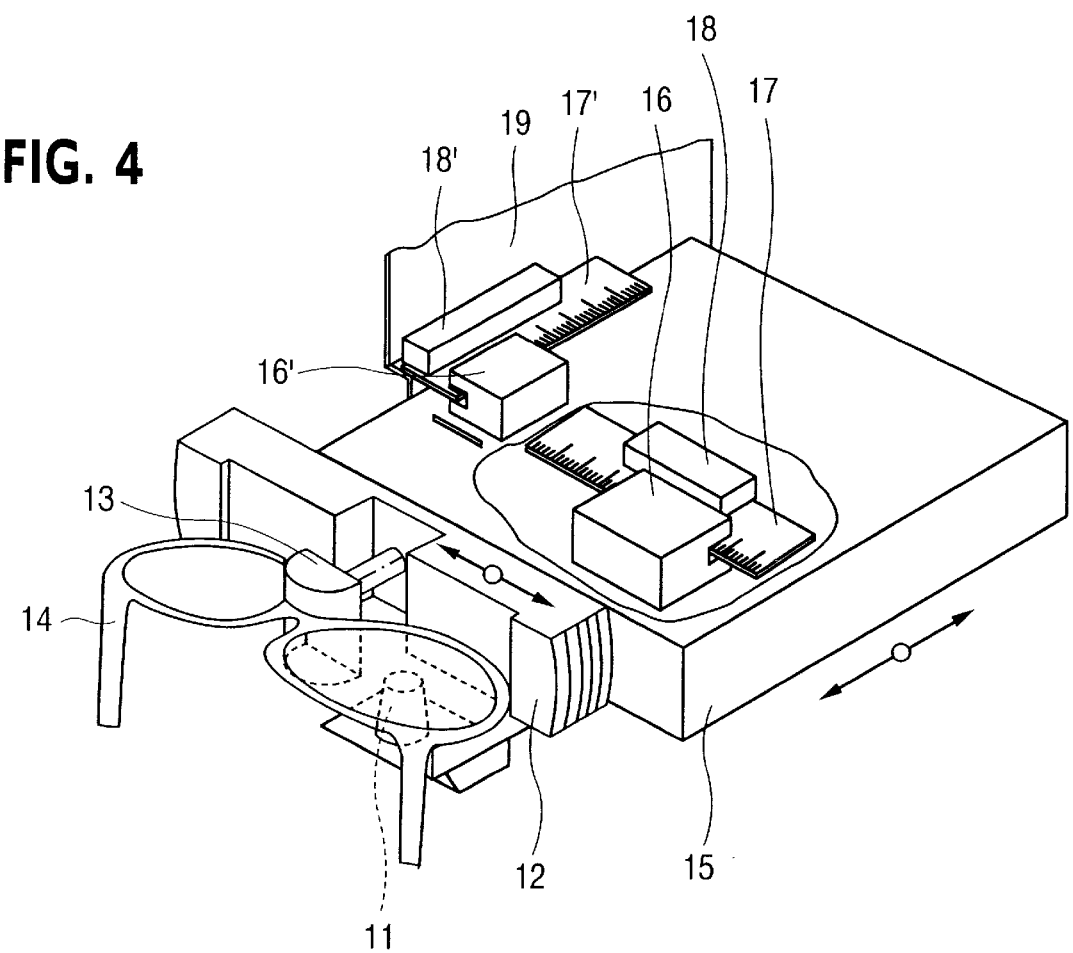

For the geometrically accurate measurement of an ophthalmic lens mentioned in the preceding, a measurement device for determination of the position of the ophthalmic lens in the x-y plane is provided in the vertex refractometer. A device of this type is depicted in FIG. 4

The eyeglass frames 14 are manually pressed against an ophthalmic lens abutment batten 12 and against a nose glide 13. The eyeglass frames 14, into which the to-be-measured lenses have already been ground, is placed with the to-be-measured lens 4 on the lens support 11 in such a manner that the frames 14 abuts on both the ophthalmic lens abutment batten 12 and, in the nose area of the frames, on the correspondingly designed nose glide 13.

Provided on a gliding device 15 which is firmly connected to the ophthalmic lens abutment batten 12, are measured value recorders respectively decoders 16, 16', which determine the movement of the scales 17 and 17' allocated to them respectively. The scales 17 and 17' are attached via attachment flanges 18 and 18' to parts, such as by way of illustration to a casing wall 19, which are stationary relative to the gliding device 15 moving in the x and y direction.

In this manner the ophthalmic lens is integrated in a system of coordinates prescribed by the abutment surfaces in such a manner that accurate distance measurement along two orthogonal spatial axes permits highly precise positioning of the ophthalmic lens by way of illustration relative to the measurement beam path.

One possible measurement course is in such a manner that first the to-be-measured ophthalmic lens is aligned along the horizontal lines of the lens utilizing the data of the engraved representations on the ophthalmic lens. Then the measurement beam is centered in the prism point of reference of the lens from which, using the exact length of the moved distances, the near and distant area of the lens can be precisely approached and measured.

The advantage of the invented process for measuring the spherical, prismatic and cylindrical power of optical lenses using the engraved representations on the ophthalmic lens lies, in particular, in that the current measured values determined by the vertex refractometer, by way of illustration the optical power in the near and distance reference point, can be compared with the data in the representations engraved on the ophthalmic lens and in this manner it can be easily determined whether there are any measuring errors. Similarly, with the aid of the exact determination of the spatial position of the to-be-measured ophthalmic lens in the x-y plane, selective positioning of the to-be-measured ophthalmic can be carried out in such a manner that long searching for specific to-be-measured areas of the ophthalmic lens can be avoided in this way.

What is claimed is:

1. An apparatus for determining parameters of an ophthalmic lens comprising:
   a vertex refractometer having a lens support for the ophthalmic lens, the vertex refractometer having a measurement beam path which passes through the ophthalmic lens when the ophthalmic lens is lying on the lens support; and
   a detection device for optical detection of at least one engraved marking on at least one predetermined surface area of the ophthalmic lens, said detection device having at least one light source, an imaging optical system for directing light from the at least one light source onto the at least one predetermined surface area of the ophthalmic lens with at least one engraved marking, and an optical receiver system having a light sensor which is connected to an evaluation and representation unit, optical receiver system imaging light beams from the imaging optical system which are reflected from the at least one predetermined surface area of the ophthalmic lens;
   wherein the vertex refractometer and the detection device are disposed so that a spacing between an axis of the measurement beam path of the vertex refractometer and an axis of the optical receiving system of said detection device is selected so that when said ophthalmic lens is positioned relative to the measuring beam path passing through the ophthalmic lens, the at least one predetermined surface area with the at least one engraved marking of said ophthalmic lens is illuminated by said at least one light source of the detection device.

2. An apparatus according to claim 1, wherein the vertex refractometer includes a measurement device for determining the position of the ophthalmic lens on the lens support along x and y directions in a lens support plane, the measurement device having abutment surfaces for an eyeglass frame in which the ophthalmic lens on the lens support is fitted, the abutment surfaces being connected to a gliding device which is movable in the x and y directions.

3. An apparatus according to claim 2, wherein abutment surfaces for the eyeglass frame include an ophthalmic abutment batten and a nose glide movable into a nose region of the eyeglass frame for securing the ophthalmic lens from shifting laterally on the lens support.

4. An apparatus according to claim 3, wherein the measurement device includes two distance meters operating orthogonally to one another for detecting movement in a position of the ophthalmic lens in an ophthalmic lens plane.

5. An apparatus according to claim 3, wherein the ophthalmic lens is movable in conjunction with the ophthalmic abutment batten and nose glide so that movement in a direction of a horizontal line of the ophthalmic lens and in an orthogonal direction thereto is determinable.

6. An apparatus according to claim 1, wherein the detection device includes first and second light sources with the optical receiver system being disposed centrally between the first and second light sources so that an optical axis of the optical receiver system is oriented perpendicular to a plane of the ophthalmic lens, and an axis of the imaging optical system for directing light from the first and second light sources onto first and second predetermined surface areas of the ophthalmic lens with respect to the optical axis of the optical receiver system delimit an angle greater than zero degrees.

7. An apparatus according to claim 1, wherein the imaging optical system of the detecting device is provided downstream of the at least one light source and includes a pair of cylindrical lenses disposed in series so that the at least one predetermined surface area of the ophthalmic lens which is irradiated by the at least one light source has an elliptical shape.

8. An apparatus according to claim 1, wherein the optical receiver system of the detection device includes a prism arrangement disposed between first and second focusing achromatic lenses.

9. An apparatus according to claim 8, wherein the first focusing achromatic lens which is disposed on an entry side of the optical receiver system forms with the prism arrangement an optical unit which is movable relative to the second focusing achromatic lens.

10. An apparatus according to claim 9, wherein the optical receiver system includes a filter which absorbs ambient light other than a wavelength of the light from the at least one light source.

11. An apparatus according to claim 9, wherein the optical receiver system includes parts movable along the optical axis of the optical receiver system.

12. An apparatus according to claim 8, wherein the prism arrangement is inserted in a beam path of said optical receiver system so that the at least one engraved marking of first and second predetermined surface areas of the ophthalmic lens is imaged sharply on the light sensor of the optical receiver system and an area between the at least one engraved marking of the first and second predetermined surface areas of the ophthalmic lens is not imaged.

13. An apparatus according to claim 1, wherein the at least one light source of the detection device includes a LED element which emits light in an infrared range.

14. An apparatus according to claim 1, wherein the axis of the measurement beam path of the vertex refractometer and the axis of the optical receiving system of the detection device are parallel to one another.

15. An apparatus according to claim 14, wherein with the ophthalmic lens being positioned relative to the measuring beam path so that a measurement beam of the measuring beam path impinges upon the ophthalmic lens in a distance reference point which is located on a surface of the ophthalmic lens above a prism reference point relative to a horizontal line of the ophthalmic lens, the light of the at least one light source of the imaging optical system of the detection device illuminates an area of the at least one predetermined surface area of the ophthalmic lens with at least one engraved marking.

16. An apparatus according to claim 14, wherein the vertex refractometer and the detection device enable exact two-dimensional measurement of the ophthalmic lens by common determination of defined lens reference points utilizing the measurement beam path and optical detection of the at least one engraved marking with respective movement of the ophthalmic lens on the lens support.

17. A process for operating an apparatus according to claim 1, comprising the steps of positioning the ophthalmic lens on the lens support, detecting the at least one predetermined surface area of the ophthalmic lens with at least one engraved marking with the detection device, obtaining data of the positioning and detection and comparing the obtained data with actually measured values.

18. A process according to claim 17, wherein the ophthalmic lens is a progressive lens, and further comprising the step of aligning the ophthalmic lens along a horizontal line thereof according to a prism reference point.

19. A process according to claim 18, further comprising the steps of measuring an optical power in at least one of a near and distance reference point of the ophthalmic lens with the vertex refractometer.

* * * * *